United States Patent [19]

Weirich et al.

[11] Patent Number: 4,536,017
[45] Date of Patent: Aug. 20, 1985

[54] CONNECTING DEVICES FOR USE WITH PNEUMATIC OR HYDRAULIC HOSES

[75] Inventors: Walter Weirich, Dortmund; Bernd Peters, Dülmen, both of Fed. Rep. of Germany

[73] Assignee: Gewerkschaft Eisenhutte Westfalia, Fed. Rep. of Germany

[21] Appl. No.: 489,862

[22] Filed: Apr. 29, 1983

[30] Foreign Application Priority Data

May 4, 1982 [DE] Fed. Rep. of Germany ....... 3216553

[51] Int. Cl.³ .............................................. F16L 35/00
[52] U.S. Cl. .................................. 285/26; 285/137 R
[58] Field of Search ....... 285/26, 29, 137 R, DIG. 14, 285/131, 28, 25, 24

[56] References Cited

U.S. PATENT DOCUMENTS 4,171,559 10/1979 Vyse et al. ...................... 285/137 R
4,319,772 3/1982 Weirich et al. ........................ 285/26

FOREIGN PATENT DOCUMENTS 3003066 7/1981 Fed. Rep. of Germany ... 285/137 R

Primary Examiner—Richard J. Scanlan, Jr.
Attorney, Agent, or Firm—Charles E. Pfund

[57] ABSTRACT

A connecting device usable with hydraulic or pneumatic multi-line hoses in mineral mining has a block containing bores interconnecting bore-outlets formed on end faces of the lock extending perpendicularly to one another. The bore outlets are disposed on common pitch circles on the end faces at equal spacings. Detachable fittings mate with the end faces. One of these fittings holds plug-pins in identical sockets formed by the bore-outlets. The other of the fittings is coupled with a multi-line hose with similar plug-pins which locate in sockets formed by the fitting in correspondence with the associated bore outlets. Provision is made for one of the plug-pins of each group to serve as alignment means for the other components and the plug-pin of the one fitting and corresponding socket of the other fitting can be re-orientated around the pitch circles of the end faces at will.

12 Claims, 5 Drawing Figures

CONNECTING DEVICES FOR USE WITH PNEUMATIC OR HYDRAULIC HOSES

BACKGROUND TO THE INVENTION

The present invention relates to a connecting device for use with pneumatic or hydraulic multi-line hoses serving to connect pneumatic or hydraulic conduits to an appliance particularly, but not solely, for use in mineral mining.

It is well known to combine a group of conduits or the like within a flexible protective cover to form a multi-line hose and to terminate such a hose with a coupling employing plug-pins—see for example U.S. Pat. No. 4,247,135 and UK patent specification No. 1362807. Devices of this type are widely used in mine workings to supply pressure fluid to drive appliances or to control operations. In the known devices the individual lines or conduits are provided with the aforesaid plug-pins which are supported by a plate inside a cap or housing. Bores or slots in the plate locate the plug-pins on a common pitch circle. A complementary fitting, say on a valve block or unit, has sockets which receive the plug-pins and the cap around the plug-pins mates with a receptor on the fitting. It is also known to use an alignment element to ensure the mating components are correctly orientated with respect to one another. This centring or alignment element may take the form of one of the plug-pins which has a greater diameter than the remaining pins and engages in a corresponding larger socket. With the larger pin and socket correctly aligned the remaining plug-pins and sockets are correctly located. Normally devices and fittings of the type described are used in the cramped conditions which are encountered in underground mine workings. This aggravates the interconnection of the devices and fittings, despite the alignment elements, especially since the hoses are robust and not easily bent or twisted. Where a hose is to take an angular course it is necessary to have a comparatively large radius and this is not always feasible where space is cramped or where the valve block is located in an awkward position. In such circumstances the fastening or release of the coupling devices linking the hoses to the appliances can cause considerable problems. To overcome these difficulties an intermediate connector as described in German patent specification No. 3015809 can be used. Such a connector can be inserted between sections of multi-line hose or between such a hose and a valve block, for example. This connector comprises two tubes connected together in a flexible manner and carrying the appropriate parts to mate with the hose coupling devices and valve block fitting. This flexible connector enables relative movement between the parts to cope with the positional relationships prevailing.

The connector itself takes up considerable space, increases the overall cost and is not always reliable. Further examples of connectors or coupling devices are described in German patent specification No. 3003066 and in the aforementioned U.S. Pat. No. 4,247,135.

A general object of the present invention is to provide an improved form of connecting device.

SUMMARY OF THE INVENTION

According to the invention a connecting device comprises a block with internal bores leading to outlets on different outer faces of the block, the outlets on each face being disposed as a group on a common pitch circle on the face, one group of outlets forming sockets for directly receiving plug-pins of a fitting, the plug-pins being supported by a plate of the fitting; wherein one of said plug pins is larger than the remaining plug-pins and serves an an alignment element and said one plug-pin can be re-located in any one of said one group of outlets.

A preferred form of connecting device constructed in accordance with the invention is of multi-part construction with a main solid block containing bores which lead to outlets or mouths on two faces of the block which extend preferably at right-angles to one another. The bore outlets lie on respective common pitch circles. One group of outlets form sockets receiving plug-pins of a fitting which can be coupled to a valve block or the like. The sockets are identical but one of the plug-pins is larger than the rest outside the socket-engaging region and this larger plug pin serves as a centering or alignment element. The larger plug-pin can thus be located in a variety of positions. The other group of outlets are intended to be connected to a known type of multi-line hose also employing plug-pins. These outlets can lead through one or more components or plates which form another fitting with sockets for the plug-pins. One of these sockets can have an enlarged diameter in relation to the others so as to receive a correspondingly larger plug-pin of the hose. This enlarged socket can lead through the block to the enlarged plug-pin of the fitting. The plate or plates defining the sockets for the plug-pins of the hose can also be re-positioned around the pitch circle of the group of bore outlets to alter the disposition of the larger socket receiving the plug-pin of the hose serving as the alignment element.

A connecting device constructed in accordance with the invention is comparatively simple and compact and permits multi-line hoses to be connected to equipment such as valve blocks even in restricted spaces without the necessity to bend the hose lines through a large radius. The angular orientations of the coupling parts can however be changed quite easily so that the hose line can take up the best position without subjecting the components to excessive force and without bending the hose line to any great extent.

The larger plug pins serving as the alignment elements can also be used as the part of the pressure fluid return path.

BRIEF DESCRIPTION OF DRAWINGS

The invention may be understood more readily and various other features of the invention may become apparent from consideration of the following description.

An embodiment of the invention will now be described, by way of example only, with reference to the accompanying drawings, wherein.

DESCRIPTION OF PREFERRED EMBODIMENTS

Figure 1:
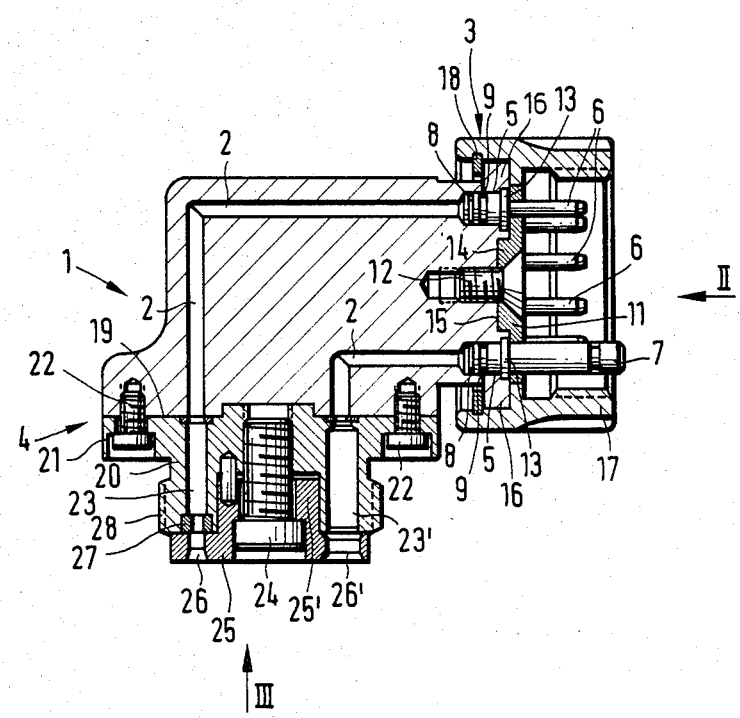
FIG. 1 is a sectional elevation of a connecting device constructed in accordance with the invention.

As shown in the drawings, a connecting device 1 constructed in accordance with the invention takes the form of a multi-part assembly with a main block provided with angularly-offset bores 2 for establishing hydraulic or pneumatic communication between two associated fittings 3, 4. The bores 2 terminate the bore outlets at end faces of the block extending perpendicularly to one another and associated, respectively, with the fittings 3, 4. The fitting 3 would normally connect to some other unit such as a valve block or the like, while the fitting 4 would normally connect with a mulit-line hose of known type. The connection to these other components is by way of plug-in type couplings.

Figure 4:
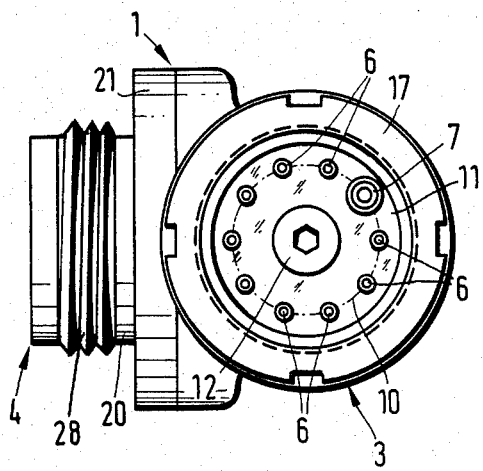
FIG. 4 is an end view of the device corresponding to FIG. 2 but with parts thereof in a different angular orientation.
Figure 2:
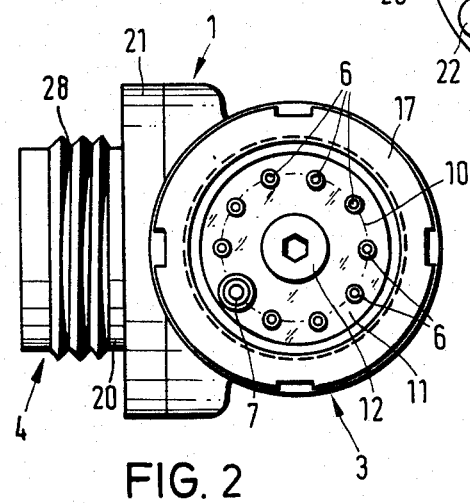
FIG. 2 is an end view of a device taken in the direction of arrow II of FIG. 1.

At the end face of the block associated with the fitting 3, the outlets of the bores 2 are all enlarged to form identical sockets 5 for receiving cylindrical end portions 8 of plug-pins 6, 7. To seal the plug-pins 6, 7 in the sockets 5, the end portions 8 of the plugs 6, 7 are provided with O-ring seals 9 seated in annular grooves. As shown in FIGS. 2 and 4 all the plug-pins 6, 7 and sockets 5 are located on a common pitch circle 10 and are equi-spaced around the circle 10. There are ten plug-pins 6, 7 in all of which one plug pin 7 is larger, outside the end portion 8, than the remaining plug-pins 6. The plug-pins 6, 7 are retained by means of a holder plate 11. The plate 11 is provided with a plurality of bores on the same pitch circle 10 which receive the plug-pins 6, 7. The plug pins 6, 7 have collars 13 which engage on the inner face of the plate 11. The holder plate 11 has a central projection 14 which fits in a recess 15 in the end face of the block. A screw 12 engages through a bore in the projection 14 and is received in a screw-threaded bore in the end face to detachably secure to the plate 11 in position. The block has an external flange 16 at the end face associated with the fitting 3 which locates with a screw-threaded cap 17. The cap 17 is itself provided with a circlip 18 or the like which fits behind the flange 16 to retain the cap in position. The cap 17 can engage in a pocket in an associated valve unit so that the individual plug-pins 6, 7 then locate in sockets in the unit. The larger plug-pin 7 itself forms a centering element for aligning the components and also extends over a greater axial length than the other plug pins 6. The plug-pin 7 serves to connect with the pressure fluid system common return while the plug-pins 6 connect individually with the pressure fluid system feed line. If the holder plate 11 is detached from the block it can be partly rotated. The plug-pin 7 can be located in any one of the ten sockets 5 and the other plug-pins 6 would then be fittted into the remaining sockets 5. The holder plate 11 is then fastened to the end face of the block with the screw 12 as shown. FIGS. 2 and 4 show the plug-pin 7 in two of its possible locations.

Figure 3:
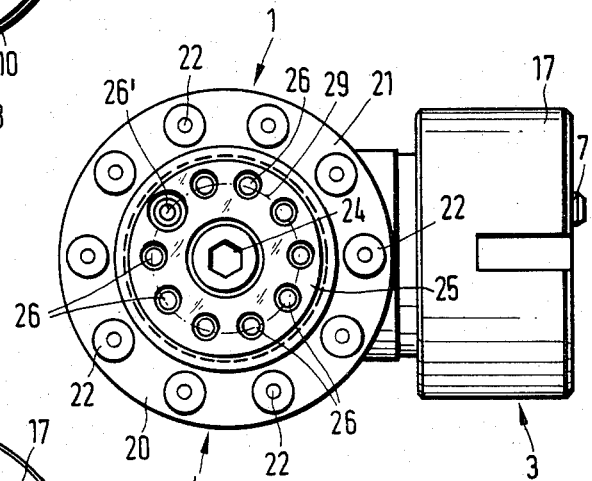
FIG. 3 is a side view of a device taken in the direction of arrow III of FIG. 1.
Figure 5:
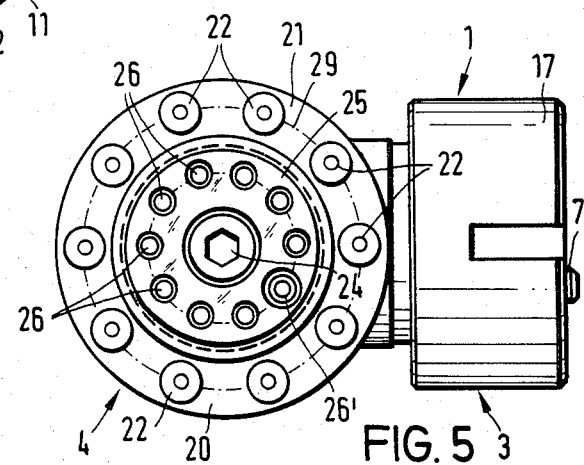
FIG. 5 is an end view of the device corresponding to FIG. 3 but with parts thereof in a different angular orientation.

The plug-pins 6, 7 communicate via the bores 2 with the other end face 19 of the block associated with the fitting 4. The outlets or mouths of the bores 2 in the end face 19 are likewise disposed on a common pitch circle 29 as represented in FIGS. 3 and 5. The fitting 4 is composed of a first component part 20 detachably and adjustably secured to the end face 19 of the block. This part 20 has a flange 21 which receives screws engaged in threaded bores in the end face 19. The part 20 has an external screw-thread 28 which receives a cap at the end of a multi-line hose (not shown) also provided with plug-pins as known per se. The part 20 can be rotated about the face 19 to assume a variety of fixing positions. The part 20 has bores 23, 23' therein which align with the mouths of the bores 2 in the end face 19. One of the bores 23' has a greater diameter than the remaining bores 23. This larger bore 23' communicates with the corresponding plug-pin 7 of the fitting 3. A holder plate 25 is fixed to the part 20 with the aid of a central screw 24. As with the plate 11, the plate 25 has a projection which engages in a recess formed at the centre of the part 20. The plate 25 is also provided with bores 26, 26' arranged on the same pitch circle 29 as the bores 23, 23' and aligned therewith to form sockets for receiving the plug-pins of the hose. The socket formed by the two coaxial larger bores 26', 23' receive a larger plug-pin—similar to the plug pin 7—which again forms a centering or location element. Sealing members 27 of annular or cartridge shape seat in enlarged recesses in the bores 23, 23' at the end face of the part 20 to engage with the plug pins. As shown in FIG. 1, the socket 26', 23' connects through one of the bores 2 with the plug-pin 7 so the pressure medium fluid return is established between the fittings 3, 4. The bores 26', 23' can however be repositioned to correspond with any change in the position of the plug-pin 7 as depicted in FIGS. 3 and 5.

Various modifications can be made to the assembly, as described, For example, the cap or housing 17 can be replaced by housing adapted to be fitted to the valve unit with a U-shaped clamp instead of screw threads. It is also not essential for the plug-pin 7 to be used as the fluid return; the plug-pin 7 and its corresponding plug-pin in the multi-line hose can serve solely for centering or locating purposes and these larger pins can engage within blind bores in the assembly.

We claim:

1. For use in multi-line hoses employed in mineral mining installation; the combination of a connecting device and an associated fitting provided with a plate supporting plug-pins; said connecting device comprising a block with internal bores leading to outlets on outer faces of the block which extend in different directions, the outlets on each said face being disposed as a group on a common pitch circle on the face, one group of outlets forming sockets for directly receiving the plug-pins of said associated fitting when said fitting is connected to said block, said one group of outlets having the same cross section to receive end regions of the plug-pins which all have the same cross section; wherein one of said plug-pins serves as an alignment element, is locatable in any one of said one group of outlets and is larger than the other plug-pins, other than the end region thereof.

2. A device according to claim 1, wherein said outer faces of the block extend perpendicularly to one another.

3. A device according to claim 1, wherein the end regions of the plug-pins have sealing rings which sealably engage with the associated sockets.

4. A device according to claim 1, wherein the outer face of the block provided with said one group of outlets has a central recess which receives a projection of the plate supporting the plug-pins and screw-threaded means detachably secures said plate to the block.

5. A device according to claim 4, wherein said plate has bores therein locating the plug-pins, one of these bores is larger in diameter than the remaining bores to receive said one plug-pin and the plug pins have collars engaging on an inner face of the support plate.

6. A device according to claim 1, wherein the block has an external flange adjacent the outer face provided with said one group of outlets and the fitting has a cap which is retained by the flange.

7. A device according to claim 1, wherein the other group of outlets are aligned with sockets defined by a further fitting, said sockets serving to receive plug-pins of a multi-line hose, one of said sockets being larger in cross-section than the remainder of the plug-pins to receive a corresponding larger plug-pin of the multi-line hose serving as an alignment element.

8. A device according to claim 7, wherein the further fitting comprises at least one plate detachably secured to the block and adjustable to bring the larger socket into various locations aligned with any one of the other group of outlets.

9. A device according to claim 7, wherein the further fitting is composed of two components detachably secured to the block and adjustable to bring the larger socket into various locations aligned with any one of the other group of outlets.

10. A device according to claim 9, wherein one of the components of the further fitting engages on the outer face of the block provided with said other group of outlets and is fixed thereto with the aid of screw-threaded members.

11. A device according to claim 10, wherein said one component has an external screw-thread for mating with a cap of said multi-line hose.

12. A device according to claim 10, wherein said one component has a central recess which receives a projection of the other component and screw-threaded means serves to secure the other component to said one component.

* * * * *

UNITED STATES PATENT AND TRADEMARK OFFICE
CERTIFICATE OF CORRECTION

PATENT NO.  : 4,536,017
DATED       : August 20, 1985
INVENTOR(S) : Weirich et al.

It is certified that error appears in the above-identified patent and that said Letters Patent is hereby corrected as shown below:

Abstract, l. 4:  change "lock" to --block--

Col. 2, l. 5:  change "an" (first occurrenct) to --as--

Col. 3, l. 9:  change "the" to --with--

Col. 3, l. 53:  change "fittted" to --fitted--

Col. 4, l. 27:  change "For" to --for--

*Signed and Sealed this*

*Fifteenth* Day of *April 1986*

[SEAL]

*Attest:*

*Attesting Officer*

DONALD J. QUIGG

*Commissioner of Patents and Trademarks*